US006403828B1

(12) United States Patent
Kuwahara et al.

(10) Patent No.: US 6,403,828 B1
(45) Date of Patent: *Jun. 11, 2002

(54) METHOD OF REFINING CRYSTALLINE MATERIAL

(75) Inventors: Hiroyuki Kuwahara; Kazuyoshi Horibe, both of Kitakyushu; Nobumasa Noma, Fukuoka-ken; Masakazu Takeuchi, Yukihashi; Yukio Akimaru, Fukuoka-ken, all of (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/462,888

(22) PCT Filed: Jul. 29, 1998

(86) PCT No.: PCT/JP98/03382

§ 371 (c)(1),
(2), (4) Date: Jan. 18, 2000

(87) PCT Pub. No.: WO99/06131

PCT Pub. Date: Feb. 11, 1999

(30) Foreign Application Priority Data

Jul. 29, 1997 (JP) .............................. 9-203430
Jul. 29, 1997 (JP) .............................. 9-203431
Jul. 29, 1997 (JP) .............................. 9-203432

(51) Int. Cl.$^7$ .............................................. C07C 51/42
(52) U.S. Cl. .................... 562/494; 422/245.1; 422/261; 62/536
(58) Field of Search .......................... 562/494; 62/536; 422/245.1, 261

(56) References Cited

U.S. PATENT DOCUMENTS

| 2,719,333 A | * | 5/1957 | Mckay | ........................ 210/179 |
| 2,910,516 A | * | 10/1959 | Rush | ........................... 62/538 |
| 3,560,585 A | * | 2/1971 | Lafay et al. | ................... 62/536 |
| 3,593,536 A | * | 7/1971 | Lafay et al. | ................... 62/536 |
| 4,588,414 A | * | 5/1986 | Takegami et al. | ......... 23/295 R |
| 4,652,675 A | * | 3/1987 | Goorden et al. | ............ 562/494 |

FOREIGN PATENT DOCUMENTS

| JP | 56152702 A | 11/1981 |
| JP | A 5794302 | 6/1982 |
| JP | 57099301 A | 6/1982 |
| JP | 57099301 | 6/1982 |
| JP | A 59066305 | 4/1984 |
| JP | A 59209607 | 11/1984 |

OTHER PUBLICATIONS

Kiyoshi Sakuma, "Present State of the Crystallization Purification Processes", Aromatics, vol. 37, No. 7–8, pp 109–127, (1985).

* cited by examiner

Primary Examiner—Paul J. Killos
Assistant Examiner—Taylor V Oh
(74) Attorney, Agent, or Firm—Birch, Stewart, Kolasch & Birch, LLP

(57) ABSTRACT

This invention relates to a process for purifying crystalline substances by charging the feed crystals containing impurities in a solid state to the top of a tower-type continuous crystallizer equipped with an agitating device, bringing said solid feed crystals into countercurrent contact with the melt formed by melting the descending crystals by a heating device provided in the lower section, taking out the purified crystals as melt from the lower section, and taking out the mother liquor containing the concentrated impurities from the upper section and comprises maintaining the temperature of the mother liquor existing in the upper section in a specified range by either heating the feed crystals or the upper section of the continuous crystallizer or making the average particle diameter of the feed crystals 2.5 mm or more. This procedure makes it possible to form good crystals and a slurry layer in the crystallization tower and yield a crystalline product of high purity in high yield even when applied to feed crystals of reportedly inferior properties.

10 Claims, 1 Drawing Sheet

METHOD OF REFINING CRYSTALLINE MATERIAL

This application is the national phase under 35 U.S.C. §371 of PCT International Application No. PCT/JP98/03382 which has an International filing date of Jul. 29, 1998, which designated the United States of America.

FIELD OF TECHNOLOGY

This invention relates to a process for purifying crystalline substances containing impurities and, more particularly, to a process for purifying crystalline substances by crystallization which comprises feeding crystalline substances containing impurities in the state of solid to a continuous crystallizer.

TECHNICAL BACKGROUND

A process known for the purification of crystalline substances comprises forming a solution or a melt of crystalline substances containing impurities with or without addition of a solvent and then cooling the solution or the melt to precipitate the object crystals. Where the crystallization is performed continuously, the precipitated crystals are melted again by a heating device provided at the bottom of a continuous crystallizer and discharged as a melt to recover the purified crystals. A crystallization process of this type is distinguished by its large throughput and its capability of attaining a high degree of purity with relative ease.

Japan Tokkyo Koho Sho 58-46322 (1983) describes a purification process which uses an agitated continuous crystallizer of the tower type containing a cooling zone in the upper section and a purifying zone in the lower section and effects the purification by charging the feed midway between the cooling and purifying zones, precipitating the crystals by cooling the feed slowly in the cooling zone while agitating only in the same plane with generation of substantially no force to transfer crystals in the vertical direction, bringing the crystal slurry of enhanced purity into countercurrent contact with the mother liquor in the purifying zone for further enhancement of the purity of the crystals, melting the crystals by a heating device provided beneath the purifying zone, and recovering the crystals as a melt. This purification process can be executed in an extremely simple apparatus with high productivity and it is highly practical when applied to an apparatus of relatively small size to medium size. However, it is difficult or impossible to purify certain kinds of crystalline substances by this process, which limits the scope of application of this process.

Japan Tokkyo Koho Sho 63-36802 (1988) describes a purification process which utilizes a tower type continuous crystallizer similar to the one described in the aforementioned Japan Tokkyo Koho Sho 58-46322 (1983) and effects the purification by melting the crystalline substances containing impurities, cooling, solidifying and pulverizing in advance and charging the powders and particles thus obtained to the crystallizer. This process has an advantage in that it is easy to prepare the feed crystals to be charged to the continuous crystallizer, but it became clear that the same problems as above remained unsolved.

In a process for purification by continuous crystallization wherein the feed consisting of crystalline substances containing impurities is charged as solid, an object of this invention is to provide a process for purification by crystallization which is applicable to a relatively wide range of feeds and operable continuously at high efficiency.

DISCLOSURE OF THE INVENTION

In a process for purifying crystalline: substances which comprises charging the feed crystals containing impurities in a solid state to a tower-type continuous crystallizer equipped with an agitating device from the top, purifying the crystals by bringing them into countercurrent contact with the melt formed by melting the precipitated crystals by a heating device provided in the lower section, taking out the purified crystals from the lower section as a melt, and taking out the mother liquor containing the concentrated impurities from the upper section, this invention relates to a process for purifying crystalline substances which comprises maintaining the temperature of the mother liquor existing in the upper section in a specified range by heating the feed crystals or the upper section of the tower-type continuous crystallizer or making the average particle diameter of the feed crystals 2.5 mm or more.

This invention also relates to a process for purifying crystalline substances which comprises heating the feed crystals to a point in the range between (normal temperature +10° C.) and (the melting point of the feed −10° C.) and charging the heated feed crystals to the aforementioned tower-type continuous crystallizer from the top.

This invention further relates to a process for purifying crystalline substances which comprises providing a heating device in the upper section of the aforementioned tower-type continuous crystallizer and heating the mother liquor existing in the upper section.

This invention still further relates to a process for purifying the aforementioned crystalline substances which comprises making the average particle diameter of the feed crystals 2.5 mm or more and forming the feed crystals in the shape of flakes with an average thickness of 0.3 mm or more. A preferred feed is benzoic acid.

A continuous crystallizer equipped with an agitator useful for this invention is satisfactorily a crystallizer of the vertical tower type provided with an inlet for the feed and the outlet for the mother liquor in the upper section and a heating device and an outlet for the product in the lower section. Although a variety of apparatuses may be used, those described in Japan Tokkyo Koho Sho 58-46322 (1983) and,"Aromatics," Vol. 37, pp. 109–127 (1985) or their partial modifications are desirable. In particular, the above-cited apparatuses from which the cooling device in the upper section is removed or in which the cooling device is replaced with a heating device are desirable.

Figure 1:
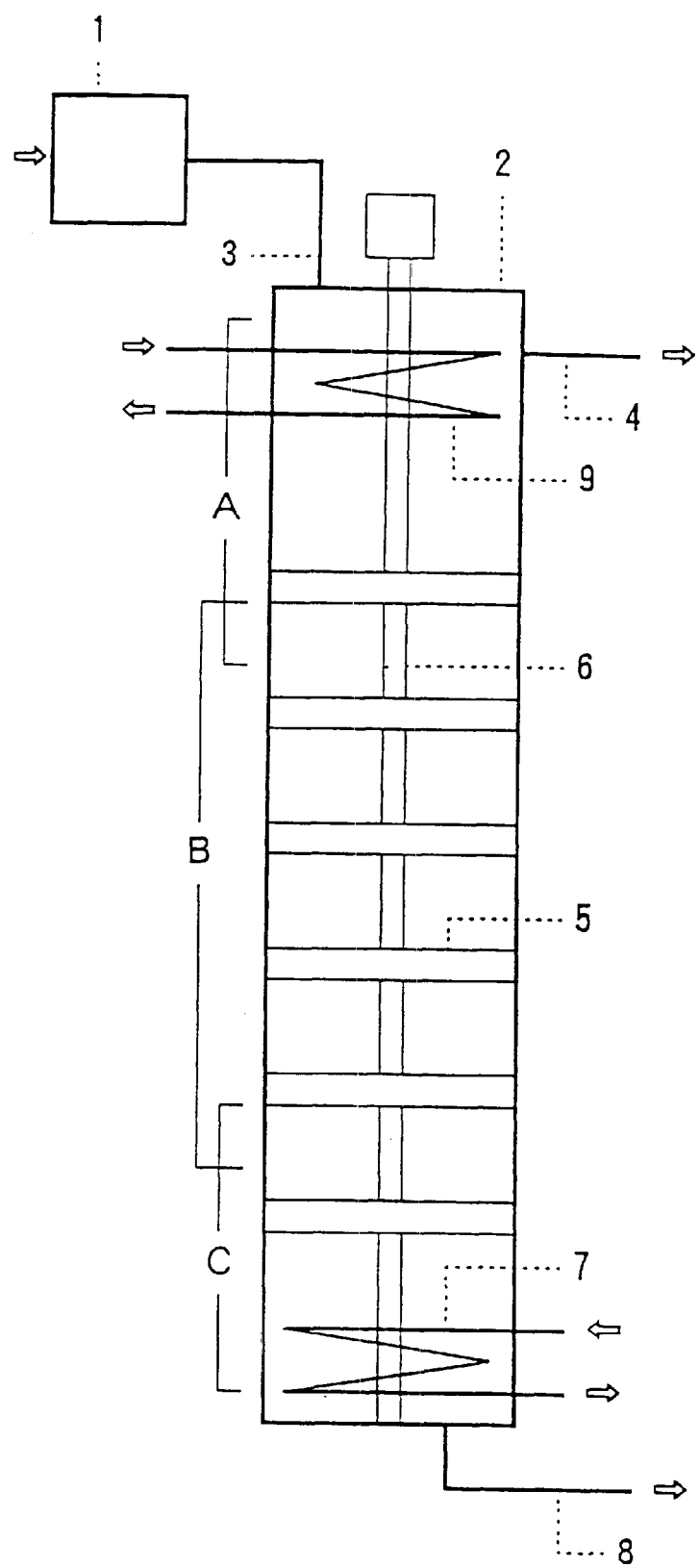
FIG. 1 is a conceptual longitudinal cross section of an example of a continuous crystallizer to execute the process of this invention for purifying crystalline substances.

The symbols stand for the following:

1: Heater for crystals
2: Crystallization tower
3: Feed line for crystals
4: Discharge line for mother liquor
5: Agitating blade
6: Agitating device
7: Heating device
8: Discharge line for product
9: Heating device
A: Mother liquor layer
B: Slurry layer
C: Melt layer

PREFERRED EMBODIMENTS OF THE INVENTION

This invention will be described in detail below with reference to the drawing.

FIG. 1 illustrates an example of a continuous crystallizer to execute the process of this invention for purifying crystalline substances and the crystallizer in question is composed of the heater for crystals 1, provided if necessary, and a tower type continuous crystallizer 2 (hereinafter referred to as crystallization tower) and the two are interconnected. The crystallization tower 2 is provided with the feed line for crystals 3, the discharge line for mother liquor 4, and the agitating device 6 fitted with the agitating blade 5 in the upper section and the heating device 7 and the discharge line for product 8 in the lower section. There are typically the mother liquor layer A in the upper section, the slurry layer B in the middle and lower sections, and the melt layer C in the lowermost section inside the crystallization tower 2, but these layers may not be clearly distinguishable from one another depending upon the conditions. The heating device 9 is provided in the crystallization tower 2, if necessary, in the upper section that corresponds to the mother liquor layer. The heating device 9 may be either a jacket which is provided outside the crystallization tower 2 and through which a heat transfer medium flows or a heating tube to be immersed directly in the mother liquor layer.

In this invention, in order to maintain the temperature of the mother liquor layer in a specified range, either the feed crystals are processed to have a specified particle size or one or both of the heater for crystals 1 and the heating device 9 are provided.

In the case where the heater for crystals 1 is provided, the feed crystals are first heated in the heater for crystals 1 to a point somewhere above normal temperature and below the melting point of the feed and introduced as solid to the crystallization tower 2. The heating here is effected to give sensible heat to the feed crystals; however, if the temperature of the crystals is raised more than is necessary, the temperature of the upper section in the crystallization tower 2, that is, the temperature of the mother liquor layer rises and the quantity of precipitating crystals diminishes. In consequence, the upper limit of the temperature during this heating is set at a point lower than the melting point of the crystals by 10° C. or more, preferably by 20° C. or more. If the temperature is too low, the feed crystals cool the surrounding mother liquor rapdily during their descent through the mother liquor layer and generate a large number of fine crystals which facilitate the generation of feather-like crystals called "dama." Hence, the lower temperature limit during the heating is set at a point higher than normal temperature by 10° C. or more, preferably by 20° C. or more. Since the drop in temperature becomes greater as the throughput increases, the temperature at which the crystals are heated is preferably controlled in response to the throughput.

In the cases where the feed crystals are at high temperature, for example, when they are taken out of the manufacturing or recovery apparatus, they may be fed as they are to the crystallization tower 2 without heating anew, but they are preferably fed after passage through the heater for crystals 1 or a warm-keeping device (not shown) because the heat balance inside the tower fluctuates unless the crystallization temperature is kept constant.

There is no restriction to the size of feed crystals to be charged to the crystallization tower 2 as long as the tower is provided with one or both of the heater for crystals 1 and the heating device 9. In the absence of one or both of them, the average particle diameter is made 2.5 mm or more, preferably 3 mm or more, more preferably 5 mm or more. Adjusting the particle diameter helps to prevent rapid melting of the crystals and sharp dropping of the temperature and improve the properties of the crystals to be formed. Even where one or both of the heater for crystals 1 and the heating device 9 are provided, the aforementioned adjustment of the particle diameter is expected to improve further the properties of the crystals to be formed. The feed crystals are spherical or flaky in shape; spherical crystals or crystals closely resembling spheres in shape are advantageous from the standpoint of handling, but flakes are advantageous when it comes to ease of forming. In the preparation of flakes, the thickness is made 0.3 mm or more, preferably 0.5 mm or more. The aforementioned average particle diameter refers to the average obtained by sampling a certain number of ordinary particles, measuring the length (x), width (y) and thickness (z) of each particle, calculating (x+y+z)/3 for each particle, and taking an average of all the particles. It is desirable for the bulk density of the feed crystals to be relatively large, say, 0.30 g/cm$^3$ or more.

The feed crystals with a too small average particle diameter rapidly cool the surrounding mother liquor during their descent through the mother liquor layer and generate a large number of fine crystals facilitating the generation of feather-like crystals called "dama." Conversely, the feed crystals with a too large average particle diameter do not melt completely and a part of them reaches unmelted to the lower part of the crystallizer. In consequence, although it is preferable to make the average particle diameter 30 mm or less, flakes with a thickness of 1 mm or so may be 100 mm or so in particle diameter without any ill effect. In the case of flakes, however, it is desirable to make the thickness 0.3 mm or more and keep the average particle diameter in the aforementioned range.

In the cases where the heating device 9 is provided in the upper section of the crystallization tower 2 and used to heat the mother liquor in this section, it is possible to decrease the rate of precipitation of crystals and improve the properties of precipitating crystals. This heating is preferably performed so that the temperature of the mother liquor reaches a point higher than the solidifying point of the mother liquor by 2° C. or more, preferably by 5 to 15° C. If there is a temperature gradient in the mother liquor layer, the aforementioned temperature refers to the average temperature. Moreover, it is preferable to control the temperature of the mother liquor in the aforementioned manner and at the same time to compensate for at least a portion, preferably 10 to 70%, of the sensible heat brought in by the crystals. Excessive heating raises the temperature of the mother liquor too high and causes the crystals to stop precipitating or to precipitate in an unnecessarily reduced quantity.

Providing the heater for crystals 1 or the heating device 9 and controlling the average particle diameter at 2.5 mm or more contribute to stabilize the temperature of the upper mother liquor layer and improve the properties of the precipitating crystals. However, since one of the two actions alone is effective, heating is not necessarily needed.

The feed crystals are charged to the crystallization tower 2 from the feed line for crystals 3. The crystals thus charged descend to the uppermost portion of the mother liquor that has ascended inside the tower, then descend slowly through the mother liquor due to the difference in specific gravity between the feed crystals and the mother liquor and reach the upper portion of the slurry layer while the crystals partly dissolve in the mother liquor. At the same time, the feed crystals lower the temperature in their vicinity to induce precipitation of crystals. The mother liquor layer is also called the crystal descending zone. The lower section of the crystal descending zone is the slurry layer where the crystals are present as slurry, and the crystals descend in contact with the ascending mother liquor while repeating dissolution and precipitation and increasing in purity. It is preferable to provide the heating device 9 in this crystal descending zone to prevent excessive cooling, and it is indispensable to provide the heating device 9 in the cases where the feed crystals are not adjusted to have the specified particle size or the heater for crystals 1 is not provided.

The crystals that have reached the slurry layer in the lower section of the crystal descending zone descend further due to the difference in specific gravity from the mother liquor, and the crystals become purified in the course of this descent as they repeat dissolution and recrystallization innumerable times and the impurities in them are transfered to the mother liquor. Hence, this zone is called the crystal purification zone. There is no clear division between the crystal descending zone and the crystal purification zone and, as shown in FIG. 1, the lower end of the mother liquor layer A or the crystal descending zone overlaps the upper end of the slurry layer or the crystal purification zone.

In order to carry out efficiently the purification of crystals in the crystal purification zone, it is important for the slurry layer to exist stably and the stability is related to the density, the shape and the like of the crystals. In particular, the properties of crystals forming in the upper section of the slurry layer are important and it is desirable to form firm crystals of a relatively high density. For this purpose, it is important to control the temperature of the mother liquor layer and prevent rapid cooling. Instability of the slurry layer makes the purification by crystallization nearly impossible because the countercurrent contact with the mother liquor becomes insufficient and the formation of "dama" crystals takes place. Moreover, it is necessary that there is a temperature gradient somewhere inside the tower, high below and low above, and the existence of the temperature gradient is related to the stability of the slurry layer.

The stability of the slurry layer is most important for stable execution of purification by continuous crystallization and the slurry layer is stabilized further by charging the feed crystals as solid, allowing a part of the crystals to reach the upper part of the slurry layer as solid, and letting the solid crystals to hold down the upper part of the slurry layer.

In this invention, keeping the temperature of the mother liquor in a specified range means keeping the mother liquor layer in a temperature range in which a part of the feed crystals dissolves or melts and another part reaches the slurry layer as solid or keeping the temperature at a point equal to or higher than the melting point of the mother liquor to be taken out, preferably higher by 2° C. or more, more preferably higher by 5 to 15° C.

Moreover, agitation is important to enhance the effectiveness of the slurry layer for purification by crystallization. It is essential that the agitation is effected only in the same plane while substantially no force is generated to transfer the crystals in the vertical direction. For this purpose, the agitating device 6 is provided in which a motor-driven vertical rotary axis extends from top to bottom inside the crystallization tower 2 and a large number of agitating blades 5 in the shape of a rod are attached to the axis. Although there is no restriction to the cross-sectional shape of the agitating blade 5, a rod with a suitable cross section such as circular, elliptical, rectangular or triangular is preferable. Furthermore, it is allowable to attach a scraping blade to the tip of an agitating rod to remove the crystals adhering to the inside wall of the crystallization tower 2 or attach another rod to the middle of an agitatig rod in such a manner as to make the two cross at right angles. Providing the aforementioned agitating device 6 stabilizes the slurry layer, prevents the generation of bridges, maintains the temperature gradient, and enhances the effectiveness of purification by crystallization.

High-purity crystals coming out of the crystal purification zone descend to the crystal melting zone where they are melted and a part of the melt is refluxed as mother liquor while the remainder is discharged as liquid out of the crystallization tower 2 from the discharge line for product 8. For this purpose, the heating device 7 by means of steam or heat transfer medium is provided in the lower section of the crystallization tower 2. There is no clear line of demarcation between the crystal purification zone and the crystal melting zone and the lower part of the former zone sometimes overlaps the latter zone. It is not necessary to make the crystal melting zone particularly long. The high-purity crystals discharged as liquid out of the crysallization tower 2 from the discharge line for product 8 are processed into the end product by means of a solidifying apparatus such as a flaker.

The main body of the crystallization tower 2 may be cylidrical. In the cases where the residence time in the crystal descending zone is prolonged in order to develop milder crystallization conditions, the tower may be modified in such a manner as to make the inside diameter of the crystal descending zone larger than that of the rest. Although the length of the crystallization tower 2 is controlled by a variety of factors such as the composition of feed crystals, the properties of the crystals, the effect of the agitating device 6, the productivity, and the required purity, a longer crystal purification zone gives a product of higher purity and the length is determined suitably.

There is no specific restriction to crystalline substances to which the process of this invention is applicable and they can be any organic or inorganic compounds, preferably solid at normal temperature, as long as they can be purified by crystallization. Examples of such compounds are naphthalene, benzoic acid, and dichlorobenzene. In particular, this invention is effective even for benzoic acid which has been difficult to purify by continuous crystallization on account of poor properties of its crystals.

In this invention, the feed crystals are charged in a solid state and besides in such a manner as to keep them from rapidly melting in the upper mother liquor layer and, because of this action, the crystals descend smoothly through the mother liquor layer while forming as little as possible of fine crystals and other undesirable crystals and reach the slurry layer and, at the same time, the crystals hold down and cover those fine crystals which are generated inside the apparatus to define the boundary between the mother liquor layer and the slurry layer. This, in concert with the effect of the agitating blades, stabilizes the slurry layer and presumably makes it possible either to purify by continuous crystallization those crystals which have been considered impossible to purify or to raise the purification efficiency.

EXAMPLE 1

Crude crystals of benzoic acid obtained by the liquid phase oxidation of toluene were purified by the continuous crystallizer shown in FIG. 1. A glass cylinder, 50 mm in inside diameter and 600 mm in length, was used as the crystallization tower 2 and the outer wall was jacketed (not shown) to allow a heat transfer medium to circulate for temperature control. At the bottom of the tower was provided the heating device 7 through which a heat transfer medium was circulated to melt the crystals. The crystallization tower 2 was provided with the discharge line for mother liquor 4 near the top and the discharge line for product 8 at the bottom respectively and was further fitted inside with the agitating device 6 to which were attached the agitating blades 5 shaped like a cylindrical bar at 50 mm intervals and nearly in contact with the inside wall of the tower.

Flakes of the crude benzoic acid crystals (purity of benzoic acid 98.5%, % by weight here and in the following), 2 mm in average particle diameter and 0.2 mm in thickness, were fed at normal temperature to the crystallization tower 2 from the top at 300 g/hr and purified by continuous crystallization. The apparatus was operated in a stationary state where the height of the crystal descending zone was approximately 150 mm and that of the crystal purification zone was approximately 400 mm in the crystallization tower 2 with the speed of the agitating device 6 set at 50 rpm. By circulating a heat transfer medium of 125° C. through the upper jacket, the temperature of the crystallization tower 2 was set at 119° C. in the upper section, at 118° C. in the middle section, and at 122° C. in the lower section.

The melt of purified benzoic acid was taken out from the discharge line for product 8 at 150 g/hr as product while the mother liquor was taken out from the discharge line for mother liquor 4 at 150 g/hr. The purity of the product was 99.98% and the concentration of benzoic acid in the mother liquor was 96%.

EXAMPLE 2

The purification was carried out as in Example 1 except feeding the crude benzoic acid crystals at 400 g/hr and taking out the purified benzoic acid at 200 g/hr and the mother liquor at 200 g/hr. The purity of the product was 99.95%.

EXAMPLE 3

Crude crystals of benzoic acid obtained by the liquid phase oxidation of toluene were fed to the top of the crystallization tower 2, the same as in Example 1, via the heater for crystals 1 shaped like a hopper.

Flakes of the crude benzoic acid crystals (purity of benzoic acid 98.5%, melting point 115–120° C.) were heated to 50° C. by the heater for crystals 1, fed as solid to the top of the crystallization tower 2 at 400 g/hr and purified by continuous crystallization. The apparatus was operated in a stationary state where the height of the crystal descending zone was approximately 150 mm and that of the crystal purification zone was approximately 400 mm in the crystallization tower 2 with the speed of the agitating device 6 set at 50 rpm. The temperature of the crystallization tower 2 was 118° C. in the upper section, 119° C. in the middle section, and 122° C. in the lower section.

The melt of purified benzoic acid was taken out from the discharge line for product 8 at 180 g/hr as product while the mother liquor was taken out from the discharge line for mother liquor 4 at 220 g/hr. The purity of the product was 99.99% and the concentration of benzoic acid in the mother liquor was 96%.

EXAMPLE 4

The purification was carried out as in Example 3 except heating the crude benzoic acid crystals to 60° C., feeding them at 500 g/hr, and taking out the purified benzoic acid at 200 g/hr and the mother liquor at 300 g/hr. The purity of the product was 99.90%.

COMPARATIVE EXAMPLES 1 AND 2

The experiment was conducted as in Example 1 or Example 2 except passing no heat transfer medium through the jacket around the upper section of the tower. "Dama" crystals formed on the surface of the mother liquor in the crystallization tower 2 and a stable condition was not obtained.

COMPARATIVE EXAMPLE 3

The experiment was carried out as in Example 3 except setting the temperature of the crude benzoic acid crystals at room temperature of 20° C. "Dama" crystals formed on the surface of the mother liquor in the crystallization tower 2 and a stable condition was not obtained.

EXAMPLE 5

The experiment was carried out as in Example 1 or Example 2 except passing no heat transfer medium through the jacket around the upper section of the tower and feeding flakes of the crude benzoic acid crystals (purity of benzoic acid 98.5%), 3 mm in average particle diameter and 0.4 mm in thickness, at normal temperature to the top of the crystallization tower 2 at 400 g/hr. The apparatus was operated in a stationary state where the height of the crystal descending zone was approximately 150 mm and that of the crystal purification zone was approximately 400 mm in the crystallization tower 2 with the speed of the agitating device 6 set at 50 rpm. The temperature of the crystallization tower 2 was 118° C. in the upper section, 119° C. in the middle section, and 122° C. in the lower section.

The melt of purified benzoic acid was taken out from the discharge line for product 8 at 200 g/hr as product while the mother liquor was taken out from the discharge line for mother liquor 4 at 200 g/hr. The purity of the product was 99.99% and the concentration of benzoic acid in the mother liquor was 96%.

EXAMPLE 6

The purification was carried out as in Example 5 except feeding the crude benzoic acid crystals at 500 g/hr and taking out the purified benzoic acid at 200 g/hr and the mother liquor at 300 g/hr. The purity of the product was 99.95%.

COMPARATIVE EXAMPLE 4

The experiment was carried out as in Example 5 except making the average particle diameter of the crude benzoic acid crystals 1 mm. "Dama" crystals formed on the surface of the mother liquor in the crystallization tower 2 and a stable condition was not obtained.

EXAMPLE 7

The continuous crystallization was carried out by feeding flakes of crude naphthalene crystals (purity of naphthalene 90.0%, content of benzothiophene 5.5%), 3 mm in average particle diameter and 0.4 mm in thickness, at normal temperature to the top of a crystallization tower, the same as in Example 1, at 700 g/hr.

The apparatus was operated in a stationary state where the height of the crystal descending zone was approximately 150 mm and that of the crystal purification zone was approximately 400 mm in the crystallization tower 2 with the speed of the agitating device 6 set at 50 rpm. The temperature of the crystallization tower 2 was 72° C. in the upper section, 77° C. in the middle section, and 79° C. in the lower section.

The melt of purified naphthalene was taken out from the discharge line for product 8 at 350 g/hr as product while the mother liquor was taken out from the discharge line for mother liquor 4 at 350 g/hr. The purity of the product was 99.0% and the concentration of naphthalene in the mother liquor was 82% and that of benzothiophene was 10%.

EXAMPLE 8

The continuous crystallization was carried out as in Example 7 except using another crude naphthalene crystals (purity of naphthalene 96.0%, content of benzothiophene 2.5%). The temperature of the crystallization tower 2 was 77° C. in the upper section, 79° C. in the middle section, and 80° C. in the lower section.

The melt of purified naphthalene was taken out from the discharge line for product 8 at 420 g/hr as product while the mother liquor was taken out from the discharge line for mother liquor 4 at 280 g/hr. The purity of the product was 99.5% and the concentration of naphthalene in the mother liquor was 90% and that of benzothiophene was 6%.

INDUSTRIAL APPLICABILITY

The process of this invention for purification by continuous crystallization is capable of forming good crystals and a slurry layer in the crystallization tower and yielding a crystalline product of high purity in high yield even when applied to feed crystals of reportedly inferior properties.

What is claimed is:

1. A process for purifying crystalline substances comprising:
    A) charging the feed crystals containing impurities in a solid state to a vertical tower continuous crystallizer equipped with an agitating device from the top of said crystallizer,
    B) bringing said solid feed crystals into countercurrent contact with the melt formed by melting the descending crystals by a heating device provided in the lower section;
    C) taking out the purified crystals as melt from the lower section; and
    D) taking out the mother liquor containing the concentrated impurities from the upper section,
        said process for purifying crystalline substances further comprising maintaining the temperature of the mother liquor existing in the upper section in a specified range by either heating the feed crystals or the upper section of the continuous crystallizer or making the average particle diameter of the feed crystals 2.5 mm or more.

2. A process for purifying crystalline substances as described in claim 1 wherein the feed crystals are heated to a point in the range from normal temperature plus 10° C. to the melting point of the crystals minus 10° C. and charged to the aforementioned vertical tower continuous crystallizer from the top.

3. A process for purifying crystalline substances as described in claim 1 wherein a heating device is provided in the upper section of the continuous crystallizer to heat the mother liquor existing in the upper section.

4. A process for purifying crystalline substances as described in claim 1 wherein the feed crystals are flakes with an average thickness of 0.3 mm or more.

5. A process for purifying crystalline substances as described in claim 1 wherein the feed is benzoic acid.

6. A process for purifying crystalline substances as described in claim 1, wherein the mother liquor is maintained at a temperature 5 to 15° C. higher than the melting point of the mother liquid.

7. A process for purifying crystalline substances as described in claim 1, wherein the feed crystals are heated to a point in the range from normal temperature plus 10° C. to the melting point of the crystals minus 10° C. and charged to the aforementioned vertical tower continuous crystallizer from the top, and wherein the feed crystals are flakes with an average thickness of 0.3 mm or more.

8. A process for purifying crystalline substances as described in claim 1, wherein the feed crystals are heated to a point in the range from normal temperature plus 10° C. to the melting point of the crystals minus 10° C. and charged to the aforementioned vertical tower continuous crystallizer from the top, and wherein a heating device is provided in the upper section of the continuous crystallizer to heat the mother liquor existing in the upper section.

9. A process for purifying crystalline substances as described in claim 1, wherein the mother liquor is maintained at a temperature 5 to 15° C. higher than the melting point of the mother liquid, and the feed crystals are heated to a point in the range from normal temperature plus 10° C. to the melting point of the crystals minus 10° C. and charged to the aforementioned vertical tower continuous crystallizer from the top, and wherein a heating device is provided in the upper section of the continuous crystallizer to heat the mother liquor existing in the upper section.

10. A process for purifying crystalline substances as described in claim 1, wherein crystallizer has a middle section containing a stable slurry layer.

* * * * *